(No Model.)

T. B. FARRINGTON.
MEASURING UTENSIL.

No. 382,870. Patented May 15, 1888.

Witnesses.
Wm F. Henning.
Louis M. F. Whitehead.

Inventor.
Thomas B. Farrington.
by Dayton, Poole & Brown,
Attorneys.

UNITED STATES PATENT OFFICE.

THOMAS B. FARRINGTON, OF NEW YORK, N. Y.

MEASURING UTENSIL.

SPECIFICATION forming part of Letters Patent No. 382,870, dated May 15, 1888.

Application filed February 6, 1888. Serial No. 263,127. (No model.)

*To all whom it may concern:*

Be it known that I, THOMAS B. FARRINGTON, of New York city, in the county of New York and State of New York, have invented certain new and useful Improvements in Measuring Utensils; and I do hereby declare that the following is a full, clear, and exact description thereof, reference being had to the accompanying drawings, and to the letters of reference marked thereon, which form a part of this specification.

This invention relates to a novel device for handling granulated or powdered substances—such, for example, as pulverulent fertilizing substances for plants and flowering shrubs known as flower-foods and similar substances; and the same consists in the matters hereinafter set forth, and pointed out in the appended claims.

Figure 1:
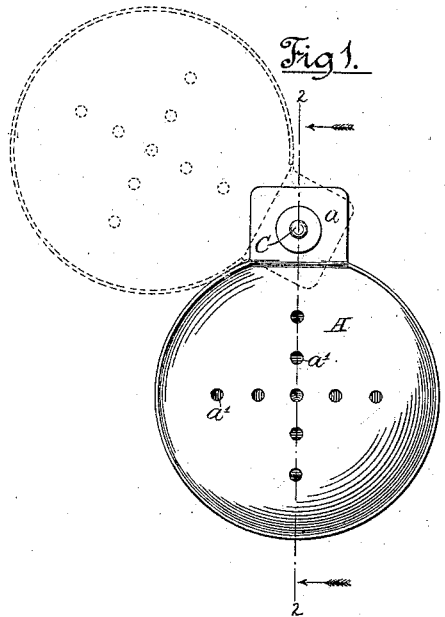
Figure 2:
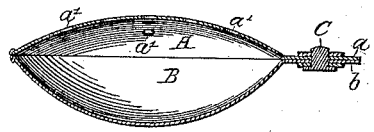
Figure 3:
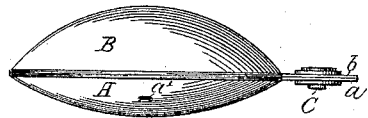

Figure 1 is a top or plan view of the device in its closed position, showing in dotted lines one of its parts rotated away from the other upon the pivot which joins them. Fig. 2 is a central vertical section of the device in its closed position. Fig. 3 is a side elevation of the device in its closed position and with its perforated part or disk on the under side, which is the position it will be given in the hand when used for sifting out its contents.

A is a saucer-shaped disk or cup of tin or other suitable material, provided with a lip or lateral extension, $a$.

B is a second saucer-shaped disk, of the same diameter as the disk A, and also provided with a lip or lateral extension, $b$. The pivot C passes through the lips $a$ and $b$, joining the two disks A and B movably around said pivot, so that the implement may be opened or closed by rotation of one of the disks upon the other, as clearly suggested by dotted lines in Fig. 1.

As the device is here shown and as the implement will be made in its most perfect form for wider application to use, the disk A is made shallower than the disk B, and is perforated at $a'$ with as many holes and of such sized holes as shall be required.

For certain particular uses the capacity of the cups or concaved disks A and B may be varied in a given ratio—as, for example, the disk A may be so concaved as to contain a single table-spoonful or other given quantity of powder or grain, and the disk or cup B may be of such concavity as to contain two table-spoonfuls or any other quantity relative to that contained by the cup A. If it is desired to take up the quantity of powder or grain which the cup A will hold, the parts A and B are spread, as shown in Fig. 1, and the cup A is dipped into the powder. The disk B, which is uppermost, will be rotated upon the pivot C and then pushed around over the cup A, and in doing so the surplus of powder taken up by the latter will be scraped off by the cup B, leaving within the cup A the desired quantity of powder. Reversing the implement, so as to bring the perforations $a'$ in the cup A uppermost, the contents may be conveyed to any desired point for use and then sifted out through said perforations in a familiar manner. On the other hand, if a larger quantity, equal to that which would be contained by the cup B, is desired to be taken up, the latter will be dipped into the powder as if it were a spoon, and the cup A will be pushed around over the cup B, scraping off the surplus and leaving within the vessel the measured quantity of material desired, which may thereafter be sifted out through the perforations $a'$, as before described.

The implement without perforations may be used for taking up and measuring other materials than powders or granulated substances—as, for example, in the measurement of butter or other materials in cooking; or it may be, if desired for use in merely measuring the quantity of granulated material which will not need to be sifted through the perforations, such as sugar and other similar substances used in cooking. In either of these latter cases the perforations are of course not necessary. For many other purposes where the same quantity of material is to be taken up, the two cups may be of the same depth, or one may be entirely flat and the other given the size for a particular measurement.

I claim as my invention—

1. A measuring implement or vessel consisting of a cup-shaped disk and a second disk pivoted thereto and swinging on its pivot in position to cut or scrape off the contents of the cup which rise above its edges.

2. The combination of two saucer or cup shaped disks of unequal concavity, pivoted together with their concaved surfaces adjacent to each other, the pivot being arranged at right angles to the planes of the meeting edges of the cups.

3. The combination of a cup shaped disk and a second disk pivoted together, with their edges in contact with each other and adapted to swing in parallel planes, one of said disks having perforations, substantially as and for the purposes set forth.

THOMAS B. FARRINGTON.

Witnesses:
C. H. DENISON,
WM. H. SIEGMAN.